US010606652B2

(12) United States Patent
Ben Zeev et al.

(10) Patent No.: US 10,606,652 B2
(45) Date of Patent: Mar. 31, 2020

(54) DETERMINING TENANT PRIORITY BASED ON RESOURCE UTILIZATION IN SEPARATE TIME INTERVALS AND SELECTING REQUESTS FROM A PARTICULAR TENANT BASED ON THE PRIORITY

(71) Applicant: HEWLETT PACKARD ENTERPRISE DEVELOPMENT LP, Houston, TX (US)

(72) Inventors: Lior Ben Zeev, Yehud (IL); Vadim Waisman, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 115 days.

(21) Appl. No.: 15/318,902

(22) PCT Filed: Jul. 28, 2014

(86) PCT No.: PCT/US2014/048392
§ 371 (c)(1),
(2) Date: Dec. 14, 2016

(87) PCT Pub. No.: WO2016/018208
PCT Pub. Date: Feb. 4, 2016

(65) Prior Publication Data
US 2017/0132046 A1    May 11, 2017

(51) Int. Cl.
*G06F 9/50* (2006.01)
*H04L 12/927* (2013.01)

(52) U.S. Cl.
CPC .......... *G06F 9/5038* (2013.01); *H04L 47/805* (2013.01); *G06F 2209/5021* (2013.01)

(58) Field of Classification Search
CPC ............................. G06F 9/5038; H04L 47/805
See application file for complete search history.

(56) References Cited

U.S. PATENT DOCUMENTS 7,921,422 B2    4/2011    Duda et al.
8,347,306 B2    1/2013    Li et al.
(Continued)

OTHER PUBLICATIONS

Das, S. et al., "CPU Sharing Techniques for Performance isolation in Multi-tenant Relational Database-as-a-Service," (Research Paper), Sep. 1-5, 2014, pp. 37-48, available at vldb.org/pvldb/vol7/p37-das.pdf.
(Continued)

*Primary Examiner* — Wissam Rashid
*Assistant Examiner* — Jorge A Chu Joy-Davila (57) ABSTRACT

Examples relate to accessing resources across multiple tenants. One example enables determination, from a list of requests, a request to perform which accesses a resource, responsive to a determination that the resource on a server is available for use for an application. The request to be performed may be determined, for example, by determining a first priority score for a first tenant associated with a first request based on usage of the resource by the first tenant, wherein the first tenant comprises a first set of users, determining a second priority score for a tenant associated with a second request based on usage of the resource by the second tenant, wherein the second tenant comprises a second set of users, and, responsive to the first priority score being lower than the second priority score, selecting the first request as the request to be performed.

16 Claims, 2 Drawing Sheets

410 DETERMINE PRIORITY SCORE FOR EACH TENANT

411 DETERMINE FIRST AMOUNT OF USAGE OF RESOURCE BY FIRST TENANT FOR FIRST PREDETERMINED TIME INTERVAL

412 DETERMINE SECOND AMOUNT OF USAGE OF RESOURCE BY FIRST TENANT FOR SECOND PREDETERMINED TIME INTERVAL

413 CALCULATE PRIORTY SCORE BASED ON FIRST AMOUNT OF USAGE AND SECOND AMOUNT OF USAGE (56) References Cited

U.S. PATENT DOCUMENTS

| | | | |
|---|---|---|---|
| 8,566,956 B2 | 10/2013 | Slater | |
| 2007/0058662 A1* | 3/2007 | Yoshikawa | H04L 12/40143 370/447 |
| 2010/0049570 A1 | 2/2010 | Li et al. | |
| 2010/0077449 A1 | 3/2010 | Kwok et al. | |
| 2011/0161973 A1* | 6/2011 | Klots | H04L 47/805 718/104 |
| 2011/0231457 A1* | 9/2011 | Tager | G06F 17/30306 707/825 |
| 2011/0265069 A1 | 10/2011 | Fee et al. | |
| 2012/0096153 A1 | 4/2012 | Weiser et al. | |
| 2012/0131174 A1 | 5/2012 | Ferris et al. | |
| 2013/0054582 A1* | 2/2013 | Macklem | G06F 17/30648 707/723 |
| 2013/0218814 A1 | 8/2013 | Kang et al. | |
| 2013/0227560 A1 | 8/2013 | McGrath et al. | |
| 2013/0254407 A1 | 9/2013 | Pijewski et al. | |
| 2014/0074641 A1 | 3/2014 | Wang | |
| 2014/0358620 A1* | 12/2014 | Krebs | G06Q 10/06315 705/7.25 |
| 2014/0359113 A1* | 12/2014 | Krebs | H04L 41/5009 709/224 |

OTHER PUBLICATIONS

International Search Report & Written Opinion received in PCT Application No. PCT/US2014/048392, dated Apr. 24, 2015, 9 pages.

Narasayya, V. et al., "SQLVM: Performance Isolation in Multi-Tenant Relational Database-as-a-Service," (Research Paper), Jan. 6-9, 2013, 9 pages, available at cidrdb.org/cidr2013/Papers/CIDR13_Paper25.pdf.

Shue, D. et al., "Fairness and Isolation in Multi-Tenant Storage as Optimization Decomposition," (Research Paper), Jan. 1, 2013, 6 pages, available at cs.princeton.edu/~mfreed/docs/pisces-osr13.pdf.

* cited by examiner

> 400 DETERMINE REQUEST TO PERFORM FROM LIST OF REQUESTS RESPONSIVE TO RESOURCE ON SERVER BECOMING AVAILABLE
>> 410 DETERMINE PRIORITY SCORE FOR EACH TENANT WITH A REQUEST IN THE LIST
>> 420 SELECT REQUEST FROM TENANT WITH THE LOWEST PRIORITY SCORE AS THE REQUEST TO PERFORM

FIG. 4A

> 410 DETERMINE PRIORITY SCORE FOR EACH TENANT
>> 411 DETERMINE FIRST AMOUNT OF USAGE OF RESOURCE BY FIRST TENANT FOR FIRST PREDETERMINED TIME INTERVAL
>> 412 DETERMINE SECOND AMOUNT OF USAGE OF RESOURCE BY FIRST TENANT FOR SECOND PREDETERMINED TIME INTERVAL
>> 413 CALCULATE PRIORTY SCORE BASED ON FIRST AMOUNT OF USAGE AND SECOND AMOUNT OF USAGE

FIG. 4B

> 410 DETERMINE PRIORITY SCORE FOR EACH TENANT
>> 414 DETERMINE USER REQUEST RELATED TO USER OF TENANT AS REQUEST TO BE PERFORMED RESPONSIVE TO PRIORITY SCORE OF FIRST TENANT BEING LOWEST PRIORITY SCORE

DETERMINING TENANT PRIORITY BASED ON RESOURCE UTILIZATION IN SEPARATE TIME INTERVALS AND SELECTING REQUESTS FROM A PARTICULAR TENANT BASED ON THE PRIORITY

BACKGROUND

Computing systems may allow multiple users to access resources via a single server. These computing systems may receive requests from the multiple users to access a resource via a server. For example, for an application executing on the server, a computing system may receive numerous requests to perform functionality via the application from multiple users, where each request may require access to a resource via the server.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

A computing system may provide access to a set of resources from a server executing an application used by multiple tenants. The computing system may manage performance of requests received by multiple tenants to ensure that a single tenant does not monopolize a resource or cause a long wait time for another tenant attempting to access the same resource. For example, responsive to a resource not being immediately available to perform a request received from a tenant, the computing system may maintain a list of pending requests for the resource.

The computing system may determine a request to perform from the list responsive to the resource becoming available. The system may determine the request to perform based on the tenants associated with the requests in the list. For example, the computing system may determine a request to perform based on usage of the resource by the tenants with requests in the list. The computing system may perform a request associated with a tenant calculated to have the least usage of the resource for the past predetermined number of time intervals. In some examples, the computing system may perform a request associated with a user of the tenant with the least usage of the resource. For example, the computing system may select a request to perform associated with a user calculated to have the least usage of the resource from a set of users associated with the tenant calculated to have the least usage of the resource.

As also noted below, each tenant may comprise an entity that includes a set of users (often multiple users). Each tenant (and each user of a tenant) may access the application via a respective tenant computing system (and user computing device). As such, discussion of functionality performed by a tenant (and/or user) may comprise functionality performed by a respective tenant computing system (and/or user computing device).

Figure 1:
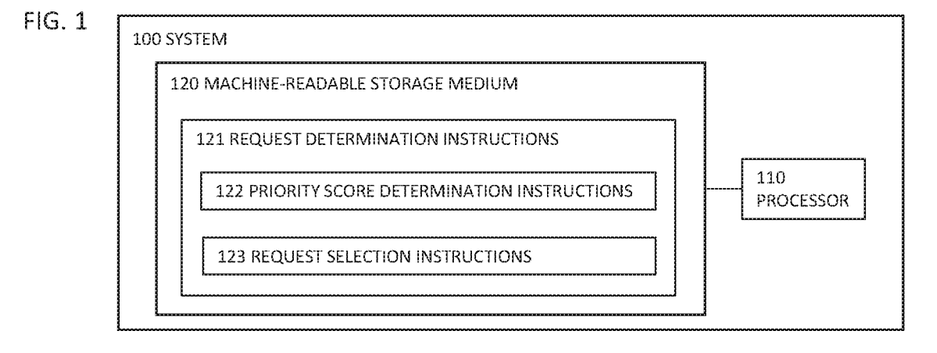
FIG. 1 is a block diagram of an example system for accessing resources across multiple tenants.

Referring now to the drawings, FIG. 1 is a block diagram of an example system 100 for accessing resources across multiple tenants. In the example depicted in FIG. 1, system 100 includes a non-transitory machine-readable storage medium 120 and a processor 110.

Referring now to the drawings, FIG. 1 is a block diagram of an example system 100 for accessing resources across multiple tenants. System 100 may comprise a cloud server, a mainframe, notebook, desktop, tablet, workstation, mobile device, and/or any other device suitable for executing the functionality described below. In the embodiment of FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, and/or other instructions to enable accessing resources across multiple tenants, as described below. As an alternative or in addition to retrieving and executing instructions, processor 110 may include one or more electronic circuits comprising a number of electronic components for performing the functionality of one or more of instructions 121, 122, 123, and/or other instructions.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for accessing resources across multiple tenants. As detailed below, storage medium 120 may maintain and/or store the data and information described herein.

Request determination instructions 121, when executed by processor 110, may determine, from a list of requests, a request to perform. The request determination instructions 121, when executed by processor 110, may determine the request to perform responsive to a resource on a server becoming available for use for an application. The application may be, for example, any application executing on a server in the system 100. The application may be executed on the server and may access other resources in the system via the server. In some examples, the application may be a cloud-based application, with an instance of the application being executed on the server in the system 100. The resources accessed by the application may comprise, for example, a database connection pool, a thread pool, a NoSQL connection pool, a file system, another computing device, and/or other resource that may be used by the application.

In some examples, the request determination instructions 121, when executed by processor 110, may receive a request to access the application from a tenant. A tenant may comprise, for example, an entity that accesses the application. A tenant may comprise a set of users, such that each user of the tenant may independently access the application. A set of independent accesses of the tenant may be performed based on a respective set of requests associated with the tenant. The respective set of requests associated with the tenant may be received from multiple users of the tenant, such that each request is associated with a user from the set of users of the tenant.

A request may comprise, for example, information related to one or more of: a request identifier, a tenant identifier of a tenant associated with the request, a user identifier of a user of the tenant associated with the request, an identification of a set of resources to be accessed by the request, data to be processed during performance of the request, a set of instructions associated with the request, an application priority associated with the request, and/or other information associated with the request.

Responsive to receiving a request to access the application from a tenant, the request determination instructions 121, when executed by processor 110, may determine whether a resource to be accessed by the request is available to perform the request. In examples in which multiple resources are to be accessed by the request, the request determination instructions 121, when executed by processor 110, may determine whether each resource is available in the order in which the resource would be accessed by the request.

Responsive to determining that the resource (or set of resources) to be accessed by the request is (are) available, the request determination instructions 121, when executed by processor 110, may perform the request.

Responsive to determining that the resource to be accessed by the request is not available, the request determination instructions 121, when executed by processor 110, may place the request in a list of requests associated with that resource. For example, the request determination instructions 121, when executed by processor 110, may place the request in the list by appending information related to the request at the end of the list of requests. The information related to the request may comprise, for example, information related to the tenant associated with the request, information related to a user associated with the request, a request identifier, an application priority associated with the request, and/or other information related to the request. The list of requests may comprise, for example, a linked list, array, and/or other structure stored in a memory (e.g., the non-transitory storage readable medium 120) that stores the information related to each request in the list.

In some examples, each resource accessible by the application executing on the server may have associated therewith a list of requests. In some example, the request determination instructions 121, when executed by processor 110, may create a list for a resource responsive to the resource being unavailable to perform a request and having no other pending requests. The request determination instructions 121, when executed by processor 110, may maintain the list of requests for each resource. As such, responsive to a second resource accessible via the server becoming available for use for the application, the request determination instructions 121, when executed by processor 110, may determine a request to perform using the second resource from a list of resources for the second resource.

In some examples, the request determination instructions 121 may comprise priority score determination instructions 122, request selection instructions 123, and/or other instructions for determining a request to perform for the application. In some examples, the request determination instructions 121, when executed by processor 110, may determine priority scores for each request in the list of requests associated with a resource and may select a request to perform responsive to the resource becoming available based on the determined priority scores. In some examples, priority score determination instructions 122, when executed by processor 110, may determine, for each tenant associated with a request in the list of requests, a respective priority score based on usage of the resource by the tenant. In some examples, the request selection instructions 123, when executed by processor 110, may select a request from a tenant with a lowest priority score as the request to be performed.

Priority score determination instructions 122, when executed by processor 110, may determine, for each tenant associated with a request in the list of requests, a respective priority score based on usage of the resource by the tenant. For example, the priority score determination instructions 122, when executed by processor 110, may manage information related to usage of the resource for each tenant. For example, the priority score determination instructions 122, when executed by processor 110, may manage information related to usage of the resource by a tenant for a plurality of predetermined time intervals. In some examples, the priority score determination instructions 122, when executed by processor 110, may manage information related to usage of the resource for a predetermined number of prior time intervals in a first in, first out manner.

Information related to usage of the resource for an individual time interval may comprise, for example, a number of requests from the tenant for the resource, a percentage of processing capability of the resource used by the tenant, an amount of time of the time interval during which processing capability was used by the resource, and/or other metric to measure usage of the resource by the tenant during the time interval.

In some examples, the priority score determination instructions 122, when executed by processor 110, may manage information related to usage of the resource by each user in a set of users of a tenant in a manner similar to the management of information related to each tenant.

The priority score determination instructions 122, when executed by processor 110, may determine, for each time interval for which information related to usage of the resource by the first tenant is stored in the storage medium 120, a respective amount of usage of the request by the first tenant. The priority score determination instructions 122, when executed by processor 110, may calculate a priority score for the tenant based on the respective amounts of usage. For example, the priority score determination instructions 122, when executed by processor 110, may use a formula to calculate the priority score for a tenant:

$$P[T]=T[X1]*N+T[X2]*(N-1)+\ldots+T[Xn]*1.$$

In the example formula, P[t] may comprise the priority score for the tenant, while N may comprise the number of predetermined time intervals over which priority score is calculated. T[Xn] may comprise, for example, a metric representing usage of the resource by the tenant, where X1 may be the newest time interval and XN may be the oldest time interval.

In some examples, the priority score determination instructions 122, when executed by processor 110, may also consider a number of users in the first set of users while calculating the priority score. For example, a tenant with a larger number of users may have a priority score indicating an increased amount of access to the resource for that tenant as compared to a tenant with a smaller number of users.

In some examples, the priority score determination instructions 122, when executed by processor 110, may also consider an application priority of the request when calculating the priority score. The application priority of the request may indicate an importance of the request to the application. The application priority associated with the request may be determined from information related to the request, based on a number of resources the request may access, based on information provided by the application, and/or by other manners.

In some examples, the priority score determination instructions 122, when executed by processor 110, may also consider a user priority associated with a user associated with the request. For example, the user priority may be determined from information related to the request, based on a role of the user as part of the tenant, based on a role of the user in the application, and/or in other manners.

In some examples, the priority score determination instructions 122, when executed by processor 110, may consider one or more additional factors (e.g., application priority, number of users in the tenant, user priority, and/or other factors) when calculating the priority score for a tenant. For example, the priority score determination instructions 122, when executed by processor 110, may use the following example formula to calculate the priority score for a tenant:

$$P[T]=(T[X1]*N+T[X2]*(N-1)+\ldots+T[Xn]*1)*(MP+ 1-RP)*((MT-TS)/100).$$

In the example formula, P[t] may comprise the priority score for the tenant, while N may comprise the number of predetermined time intervals over which priority score is calculated. T[Xn] may comprise, for example, a metric representing usage of the resource by the tenant, where X1 may be the newest time interval and XN may be the oldest time interval. RP may comprise an application priority of the request, while MP may comprise a maximum application priority for any request of the application. TS may comprise tenant size of the tenant, while AS may comprise average tenant size.

In some examples, the priority score determination instructions 122, when executed by processor 110, may only determine priority score for tenants associated with requests in the list of requests for a resource. In these examples, the request selection instructions 123, when executed by processor 110, may select a request associated with a tenant with the lowest priority score. For example, responsive to the list of requests comprising only a single request for the tenant with the lowest priority score, the request selection instructions 123, when executed by processor 110, may select that request to perform. In other examples, responsive to the list of requests comprising multiple requests for that tenant, the request selection instructions 123, when executed by processor 110, may randomly select a request from the multiple requests, may select the newest request, may select the oldest request, and/or may otherwise select a request to perform from the multiple requests associated with that tenant.

In some examples, the priority score determination instructions 122, when executed by processor 110, may determine a user priority score for users associated with requests of a tenant with the lowest priority score. The request selection instructions 123, when executed by processor 110, may select a request associated with a user with the lowest priority score from a set of requests associated with the tenant with the lowest priority score.

For example, responsive to the list of requests comprising only a single request for the tenant with the lowest priority score, the request selection instructions 123, when executed by processor 110, may select that request to perform. In some examples, responsive to the list of requests comprising multiple requests for that tenant, the request selection instructions 123, when executed by processor 110, may select a request randomly, may select the newest request, may select the oldest request, may select a request based on a calculated user priority score for each user associated with a request of the multiple requests, and/or may otherwise select a request to perform.

In some examples, the request selection instructions 123, when executed by processor 110, may select a request associated with a user with the lowest priority score from a set of requests associated with the tenant with the lowest priority score. The priority score determination instructions 122, when executed by processor 110, may calculate a user priority score associated with each user associated with a request in a manner similar to calculating a priority score for a tenant associated with requests.

As mentioned above, information related to usage of the resource by each user of the tenant may be managed. For example, the priority score determination instructions 122, when executed by processor 110, may determine usage of the resource by each user for predetermined time intervals. In some examples, the priority score determination instructions 122, when executed by processor 110, may calculate a user priority score using one or more of the formulas and/or considering one or more additional factors as set forth above for calculating priority score for a tenant, using the metrics associated with usage by the user instead of usage by a tenant.

The priority score determination instructions 122, when executed by processor 110, may determine, for each tenant associated with a request in the list of requests, a respective priority score based on usage of the resource by the tenant in various manners, and is not limited to the examples described herein.

Figure 2:
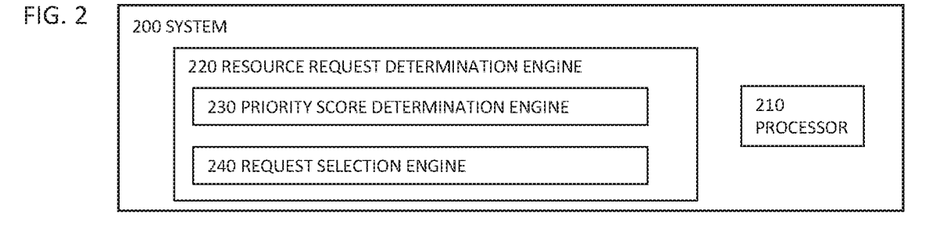
FIG. 2 is a flowchart of an example system for accessing resources across multiple tenants.

FIG. 2 is a block diagram of an example system 200 for accessing resources across multiple tenants. As with system 100, system 200 may comprise a cloud server, a mainframe, notebook, desktop, tablet, workstation, mobile device, and/or any other device suitable for executing the functionality described below. As with processor 110 of FIG. 1, processor 210 may be one or more CPUs, microprocessors, and/or other hardware devices suitable for retrieval and execution of instructions.

As detailed below, system 200 may include a series of engines 220-240 for accessing resources across multiple tenants. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Resource request determination engine 220 may determine, responsive to a resource on a server becoming available for use for an application, a request to perform from a list of requests, wherein the request comprises access to the resource. In some examples, the resource request determination engine 220 may determine the request to perform in a manner the same as or similar to that of the resource request determination instructions 122 of system 100. Further details regarding an example implementation of resource request determination engine 220 are provided above in connection with resource request determination instructions 121 of FIG. 1.

In some examples, resource request determination engine may comprise priority score determination engine 230, request selection engine 240, and/or other engines to determine a request to perform.

Priority score determination engine 230 may determine a respective priority score for each tenant associated with a request in the list based on usage of the resource by the tenant. In some examples, the priority score determination engine 230 may determine the priority scores for tenants in a manner the same as or similar to that of the system 100. Further details regarding an example implementation of priority score determination engine 230 are provided above in connection with priority score determination instructions 122 of FIG. 1.

Request selection engine 240 may select a request to perform the list of requests, wherein the selected request is associated with a tenant with the lowest priority score. In some examples, the request selection engine 240 may select the request to perform in a manner the same as or similar to that of the system 100. Further details regarding an example implementation of request selection engine 240 are provided above in connection with request selection instructions 123 of FIG. 1.

Figure 3:
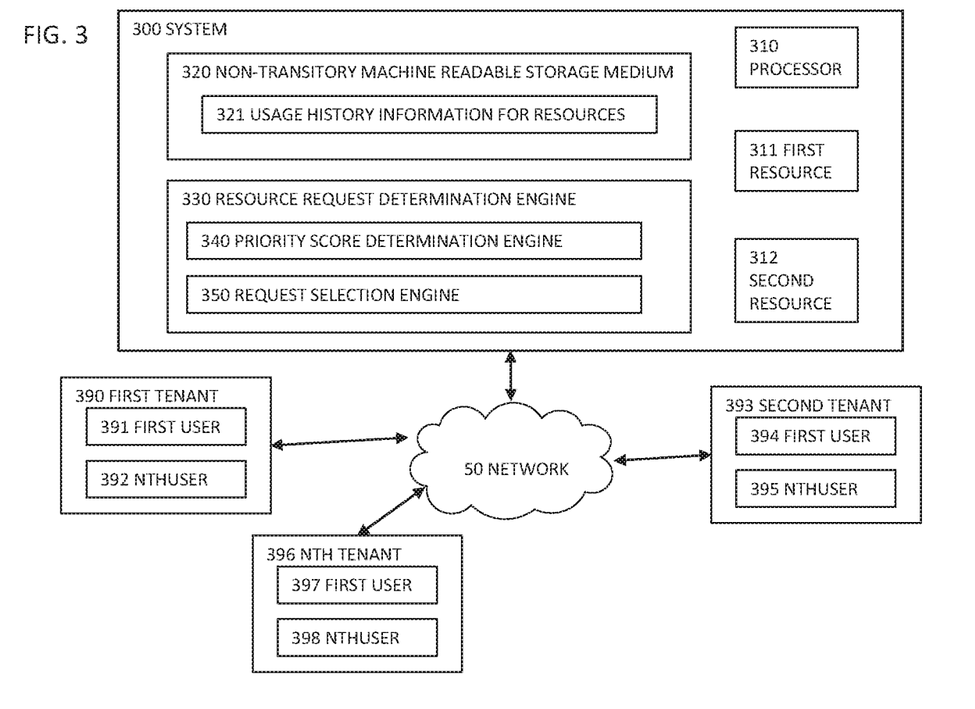
FIG. 3 is a flowchart of an example system for accessing resources across multiple tenants.

FIG. 3 is a block diagram of an example system for accessing resources across multiple tenants. As illustrated in FIG. 3 and described below, system 300 may comprise a processor 310, a non-transitory machine readable storage medium 320, a series of engines 330-350 for accessing resources across multiple tenants, a first resource 311, a second resource 312, and/or other components.

The system 300 may communicate with tenants via tenant computing systems 390, 393, 396, and/or other tenant computing systems. Each tenant system may comprise multiple user computing devices. For example, tenant computing system 390 for a first tenant may comprise computing devices 391 and 392 for a first user and second user, respectively. Similarly, tenant computing system 393 for a second tenant may comprise computing devices 394 and 395 for a first user and second user, respectively. Tenant computing system 396 for a third tenant may comprise computing devices 397 and 398 for a first user and second user, respectively. The number of tenant computing systems and user computing devices in each tenant system are not limited to the examples described herein.

As with processor 110 of FIG. 1, processor 310 may be one or more CPUs, microprocessors, and/or other hardware devices suitable for retrieval and execution of instructions. As with machine-readable storage medium 120, non-transitory machine-readable storage medium 320 may be any hardware storage device for maintaining data accessible to system 100. As with engines 220-240, engines 330-350 may generally represent any combination of hardware and programming.

Non-transitory machine-readable storage medium 320 may store usage history information 321 for resources. The usage history information 321 may comprise, for example, information related to usage of each resource accessible via the server for the application. The information related to usage of an individual resource may comprise, for example, usage information by each tenant for a predetermined number of time intervals. The usage information for a tenant may be the same as or similar to the usage information described above.

Resource request determination engine 330 may perform functionality the same as or similar to that of the resource request determination engine 220 of system 200. Further details regarding an example implementation of resource request determination engine 330 are provided above in connection with resource request determination engine 220 of system 200.

In some examples, resource request determination engine 330 may comprise priority score determination engine 340, request selection engine 350, and/or other engines to determine a request to perform.

Priority score determination engine 340 may perform functionality the same as or similar to that of the priority score determination engine 230 of FIG. 2. Further details regarding an example implementation of priority score determination engine 340 are provided above in connection with priority score determination engine 230 of FIG. 2.

Request selection engine 350 may perform functionality the same as or similar to that of the request selection engine 240 of FIG. 2. Further details regarding an example implementation of request selection engine 350 are provided above in connection with request selection engine 240 of FIG. 2.

The resources 311, 312, and/or other resources of system 300 may comprise, for example, resources similar to the resources described with regard to FIG. 1. The resources 311, 312, and/or other resources may generally comprise a combination of hardware and software for storing information and/or providing functionality for the application.

As shown in FIG. 3, each tenant computing system (and user computing device) may communicate with system 100 to access resources of system 100 for the application.

Figure 4:
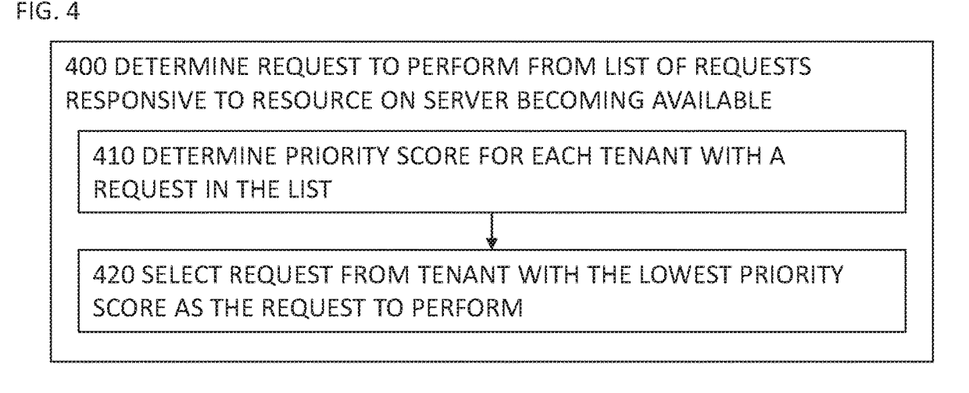
FIG. 4 is a flowchart of an example method for accessing resources across multiple tenants.

FIG. 4 is a flowchart of an example method for execution by a computing device for accessing resources across multiple tenants.

Although execution of the methods described below are with reference to system 100 of FIG. 1 system 200 of FIG. 2, and/or system 300 of FIG. 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 400, a request to perform may be determined from a list of requests responsive to a resource on a server becoming available for use via an application, wherein performing the request comprises accessing the resource. For example, the system 100 (and/or the resource request determination instructions 121, the resource request determination engine 220, or other resource of the system 100) may determine the request to perform. The system 100 may determine the request to perform a manner similar or the same as that described above in relation to the execution of the resource request determination instructions 121, the resource request determination engine 220, and/or other resource of the system 100.

In some examples, operation 400 may comprise operations 410, 420, and/or other operations to determine a request to perform.

In an operation 410, a respective priority score for each tenant associated with a request in the list may be determined based on usage of the resource by each tenant. For example, the system 100 (and/or the priority score determination instructions 122, priority score determination engine 230, or other resource of the system 100) may determine the priority scores. The system 100 may determine the priority scores in a manner similar or the same as that described above in relation to the execution of the priority score determination instructions 122, priority score determination engine 230 of the system 100.

Figure 4A:
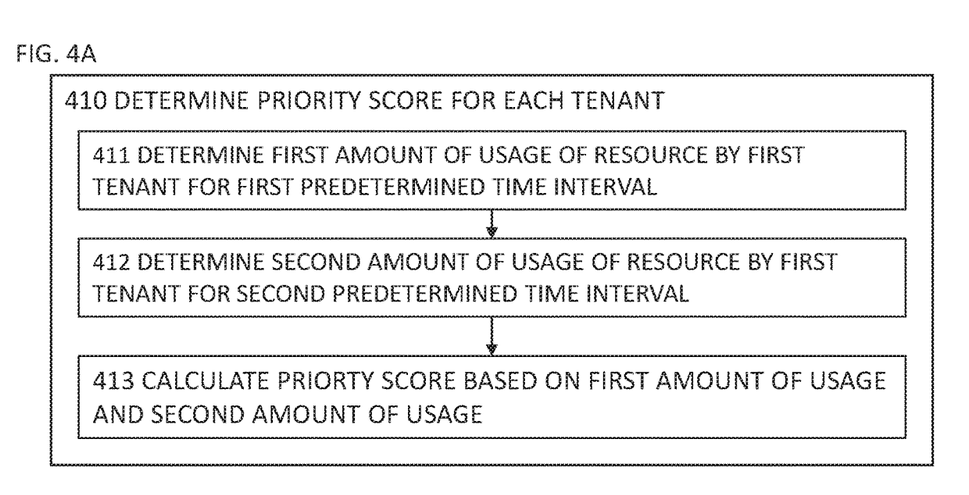
FIG. 4A is a flowchart of an example method for determining a priority score for each tenant.

In some examples, a priority score for a tenant may be determined in various manners. FIG. 4A is a flowchart of an example method for execution by a computing device for determining a priority score for each tenant.

In an operation 411, a first amount of usage of the resource by a tenant for a first predetermined time interval may be determined. For example, the system 100 (and/or the priority score determination instructions 122, priority score determination engine 230, or other resource of the system 100) may determine the first amount of usage. The system 100 may determine the first amount of usage in a manner similar or the same as that described above in relation to the execution of the priority score determination instructions 122, priority score determination engine 230 of the system 100.

In an operation 412, a second amount of usage of the resource by a tenant for a first predetermined time interval may be determined. For example, the system 100 (and/or the priority score determination instructions 122, priority score determination engine 230, or other resource of the system 100) may determine the second amount of usage. The system 100 may determine the second amount of usage in a manner similar or the same as that described above in relation to the execution of the priority score determination instructions 122, priority score determination engine 230 of the system 100.

In an operation 413, a priority score for a tenant may be calculated based on the first amount of usage and the second amount of usage. For example, the system 100 (and/or the priority score determination instructions 122, priority score determination engine 230, or other resource of the system 100) may calculate the priority score. The system 100 may calculate the priority score in a manner similar or the same as that described above in relation to the execution of the priority score determination instructions 122, priority score determination engine 230 of the system 100.

Figure 4B:
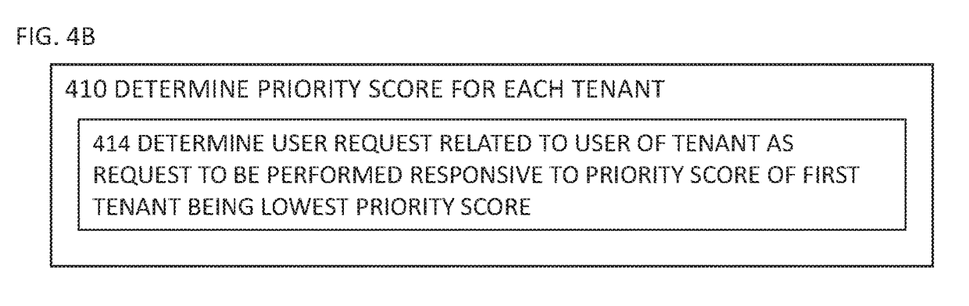
FIG. 4B is a flowchart of an example method for determining a priority score for each tenant.

FIG. 4B is a flowchart of another example method for execution by a computing device for determining a priority score for each tenant.

In an operation 411, a user request related to a user of a tenant may be determined as the request to perform responsive to a priority score of the tenant being the lowest determined priority score. For example, the system 100 (and/or the priority score determination instructions 122, priority score determination engine 230, or other resource of the system 100) may determine the user request. The system 100 may determine the user request in a manner similar or the same as that described above in relation to the execution of the priority score determination instructions 122, priority score determination engine 230 of the system 100.

Returning to FIG. 4, in an operation 420, a request to be performed may be selected from the list of requests associated with a first tenant with a lowest priority score. For example, the system 100 (and/or the request selection instructions 123, the request selection engine 240, or other resource of the system 100) may select the request. The system 100 may select the request in a manner similar or the same as that described above in relation to the execution of the request selection instructions 123, the request selection engine 240, or other resource of the system 100.

The foregoing disclosure describes a number of example embodiments for accessing resources across multiple tenants. The disclosed examples may include systems, devices, computer-readable storage media, and methods for accessing resources across multiple tenants. For purposes of explanation, certain examples are described with reference to the components illustrated in FIGS. 1-4B. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-4B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions executable by a processor of a computing device to:

responsive to a resource on a server becoming available for use via an application, determine, from a list of requests, a request for the server to perform involving use of the resource by the application;

wherein determining the request from the list of requests comprises:

determining a first priority score for a first tenant of a plurality of tenants associated with a first request of the list of requests, wherein the first tenant comprises a first set of users and determining the first priority score comprises:

determining a first metric representing an amount of usage of the resource by the first tenant during a first time interval;

scaling the first metric based on a first multiplier;

determining a second metric representing an amount of usage of the resource by the first tenant during a second time interval other than the first time interval;

scaling the second metric based on a second multiplier other than the first multiplier; and calculating the first priority score based on the scaled first metric and the scaled second metric; and determining a second priority score for a second tenant of the plurality of tenants associated with a second request of the list of requests based on usage of the resource by the second tenant, the second tenant comprising a second set of users; and responsive to the first priority score and the second priority score, selecting the first request as the request to be performed.

2. The storage medium of claim 1, wherein the instructions to determine the first priority score comprise instructions to:

calculate the first priority score further based on a number of users in the first set of users.

3. The storage medium of claim 2, wherein the instructions to determine the first priority score comprise instructions to:

calculate the first priority score further based on a first user priority score determined for a first user of the first set of users of the first tenant associated with the request.

4. The storage medium of claim 1, wherein the instructions to determine the first priority score comprise instructions to:

calculate the first priority score based on an application priority of the first request, wherein the application priority of the first request indicates an importance of the first request to the application.

5. The storage medium of claim 1, further comprising instructions executable by the processor to:

receive the first request to access the application from the first tenant;

determine whether the resource to be accessed by the first request is available to perform the first request; and responsive to the resource not being available to perform the first request, place the first request in the list of requests.

6. The storage medium of claim 5, further comprising instructions executable by the processor to:

perform the first request responsive to determining that the resource to be accessed by the first request is available to perform the first request.

7. The storage medium of claim 1, wherein the instructions further comprise instructions to:

vary the first and second multipliers according to time such that the scaled first metric has more influence on the first priority score than the scaled second metric, wherein the first time interval occurs more recently than the second time interval.

8. The storage medium of claim 1, wherein the instructions further comprise instructions to select the first request based on the first priority score being less than the second priority score.

9. A system comprising:
a processor; and
a memory to store instructions that, when executed by the processor, cause the processor to:
determine, responsive to a resource on a server becoming available for use via an application, a request for the server to perform from a list of requests, wherein the server performing the request comprises the application accessing the resource;

wherein determining the request comprises:
determining a first priority score for a first tenant of a plurality of tenants associated with a first request of the list of requests, wherein the first tenant comprises a first set of users and determining the first priority score comprises:
determining a first metric representing an amount of usage of the resource by the first tenant during a first time interval;
scaling the first metric based on a first multiplier;
determining a second metric representing an amount of usage of the resource by the first tenant during a second time interval other than the first time interval;
scaling the second metric based on a second multiplier other than the first multiplier; and
calculating the first priority score based on the scaled first metric and the scaled second metric;
determining a second priority score for a second tenant of the plurality of tenants, wherein the second priority score is associated with a second set of requests of the list of requests based on usage of the resource by the second tenant, and the second tenant comprises a second set of users; and
responsive to the first priority score and the second priority score, selecting the first request as the request to be performed.

10. The system of claim 9, wherein the memory further stores instructions that, when executed by the processor, cause the processor to determine, responsive to a second resource on the server becoming available for use via the application, a second request to perform from a second list of requests, wherein the second request comprises a request to access to the second resource.

11. The system of claim 9, wherein the memory further stores instructions that, when executed by the processor, cause the processor to:
receive the first request to access the application from the first tenant;
determine whether the resource to be accessed by the first request is available to perform the request; and
responsive to the resource not being available to perform the first request, place the first request in the list of requests.

12. The system of claim 9, wherein the instructions, when executed by the processor, further cause the processor to:
vary the first and second multipliers according to time such that the scaled first metric has more influence on the first priority score than the scaled second metric, wherein the first time interval occurs more recently than the second time interval.

13. A method comprising:
responsive to a resource on a server becoming available for use via an application, determine a request for the server to perform using the application from a list of requests, wherein performing the request comprises accessing the resource,
wherein determining the request from the list of requests comprises:
determining a respective priority score for each tenant of a plurality of tenants, wherein the respective priority score is associated with a request in the list of requests based on usages of the resource by the each tenant in respective time intervals, wherein determining the respective priority score for the each tenant comprises, for a given tenant of the plurality of tenants:
  determining a first metric representing an amount of usage of the resource by the given tenant during a first time interval;
  scaling the first metric based on a first multiplier;
  determining a second metric representing an amount of usage of the resource by the given tenant during a second time interval other than the first time interval;
  scaling the second metric based on a second multiplier other than the first multiplier; and
  calculating the respective priority score for the given tenant based on the scaled first metric and the scaled second metric; and
selecting, as the request to perform, a request from the list of requests associated with the given tenant based on the respective priority score for the given tenant.

14. The method of claim 13, further comprising:
  receiving the request to access the application from the given tenant;
  determining whether the resource to be accessed by the request is available to perform the request; and
  responsive to the resource not being available to perform the request, placing the request in the list of requests.

15. The method of claim 13, wherein determining the respective priority score of the given tenant comprises:
  varying the first and second multipliers according to time such that the scaled first metric has more influence on the respective priority score than the scaled second metric, wherein the first time interval occurs more recently than the second time interval.

16. The method of claim 13, wherein selecting the request comprises selecting the request associated with the lowest respective priority score of the respective priority scores.

* * * * *